United States Patent

Katsumoto

[11] Patent Number: 5,387,936
[45] Date of Patent: Feb. 7, 1995

[54] IMAGING APPARATUS
[75] Inventor: Toru Katsumoto, Kanagawa, Japan
[73] Assignee: Sony Corporation, Japan
[21] Appl. No.: 989,382
[22] Filed: Dec. 11, 1992
[30] Foreign Application Priority Data
Dec. 28, 1991 [JP] Japan .................. 3-360447
[51] Int. Cl.[6] .................. H04N 5/225; H04N 5/228
[52] U.S. Cl. .................. 348/335; 348/207; 348/208
[58] Field of Search ............ 358/209, 225, 229, 199;
348/202, 203, 204, 205, 351, 352, 355, 46, 73,
74, 95, 96, 195, 208, 335, 219, 228, 221, 345,
346, 350, 357

[56] References Cited
U.S. PATENT DOCUMENTS

| 4,611,244 | 9/1986 | Hanma et al. | 358/227 |
| 4,812,912 | 3/1989 | Iida et al. | 358/227 |
| 5,083,302 | 1/1992 | Tsuyuguchi et al. | 369/44.11 |
| 5,144,491 | 9/1992 | Ushiro et al. | 359/697 |
| 5,185,669 | 2/1993 | Kato | 358/227 |
| 5,194,956 | 3/1993 | Iwamoto | 358/209 |

FOREIGN PATENT DOCUMENTS

| 294967 | 4/1990 | Japan | H04N 5/225 |
| 482382 | 3/1992 | Japan | H04N 5/225 |
| 5183795 | 7/1993 | Japan | . |

Primary Examiner—Michael T. Razavi
Assistant Examiner—Bipin Shalwala
Attorney, Agent, or Firm—Ronald P. Kananen

[57] ABSTRACT

In an imaging apparatus for driving a lens system mounted a housing by way of a linear motor, a detection is made of a component of force along an optical axis direction, among external force applied to the lens system based upon a drive current outputted from the lens driving means under control of the control means during the stationary servo mode. As a result, the component force given to the lens system along the optical axis direction can be detected. Thus, a so-called "ground imaging operation" in which the camera is inadvertently left on and pointed at the ground can be prevented without providing any sensor of the optical axis.

9 Claims, 1 Drawing Sheet

IMAGING APPARATUS

BACKGROUND OF THE INVENTION

1. Field of the Invention

The present invention generally relates to an imaging apparatus such as a video tape recorder. More specifically, the present invention is directed to an imaging apparatus suitable for a video tape recorder in which a lens is driven to a predetermined position with a linear motor.

2. Description of the Prior Art

Conventionally, there are two drive means for moving an imaging lens of a camera-integral type video tape recorder to a predetermined position, namely a mechanical drive mechanism and an electrical drive mechanism in which a linear motor is used as the drive means.

A camera-integral type video tape recorder utilizes a video camera which is electrically and mechanically combined with a vide tape recorder in an integral construction.

In the conventional electrical drive mechanism using a linear motor, a magnetic piece is attached to the imaging lens, and a large quantity of magnetic coil elements are arranged on a cylinder-shaped housing used to guide this imaging lens, so that the imaging lens is driven by using a magnetic flux produced from these magnetic coil elements.

However, at times it occurs that an operator forgets to depress a record stop key, even though the action to be recorded is interrupted.

In this case, there is the risk an undesired image of the ground will be continuously recorded on the video tape.

Accordingly, a sensor for preventing a recording of an image of the ground is mounted on the housing. This sensor is independent of the imaging lens system, and prevents such "a ground imaging operation" in the conventional camera-integral type video tape recorder. However, there are problems that since such a sensing member is newly required, the camera-integral type video tape recorder cannot be made compact and also power consumption thereof is increased.

SUMMARY OF THE INVENTION

The present invention has been made in an attempt to solve the above-described problems of the prior art imaging apparatus, and therefore, has an object to provide an imaging apparatus capable of preventing a so-called "ground imaging operation" without employing such a misoperation preventing sensor, or the like.

To solve the above-described problems and also to achieve the object, in an imaging apparatus wherein lens systems 5, 6 mounted in a housing 4 are driven by a linear motor 7, there are provided position detecting means for detecting lens positions of the lens systems 5 and 6; lens driving means 10 for driving the lens systems 5 and 6 to predetermined positions; control means 9 for controlling the lens driving means 10 in response to position detecting information S1 of the position detecting means; and component force detecting means 9 for detecting a component force of an external force "g" applied to the lens systems 5 and 6 along a direction to an optical axis of the lens systems 5 and 6 based upon both of the position detecting information S1 and a control signal S6 during a stationary servo mode. In accordance with the imaging apparatus, acceleration given to the imaging direction and the lens systems 5 and 6 is detectable by detecting the component force of the external force given to the lens systems 5 and 6 along the direction of the optical axis in response to the position detecting information S1 and the control signal S6.

As a result, the ground imaging operation by the imaging apparatus can be prevented and also the acceleration of the vehicle and the like can be sensed without newly employing any sensor.

BRIEF DESCRIPTION OF THE DRAWINGS

For a better understanding of the present invention, reference is made of the detailed description in conjunction with the accompanying drawings, in which.

DETAILED DESCRIPTION OF THE PREFERRED EMBODIMENTS

Referring now to drawings, an imaging apparatus according to one preferred embodiment of the present invention.

Figure 1:
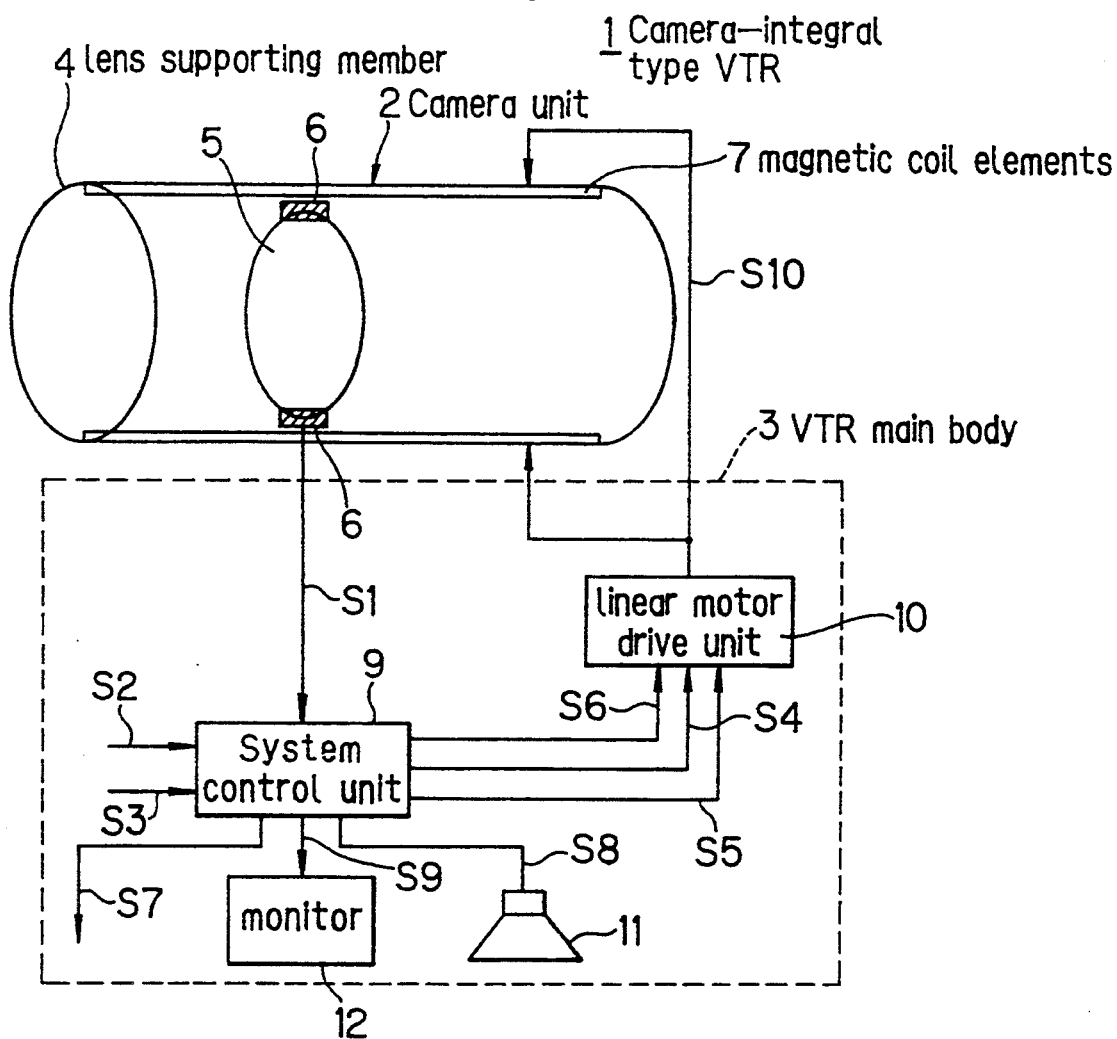
FIG. 1 is a schematic connection diagram for showing an imaging apparatus according to a preferred embodiment of the present invention.

FIG. 1 schematically represents a construction of an imaging apparatus in accordance with the preferred embodiment of the present invention. In this drawing, reference numeral 1 indicates an overall camera-integral type video tape recorder. This video tape recorder 1 is constructed of a camera unit 2 and a main body 3 of the video tape recorder. The camera unit 2 slidably holds an imaging lens 5 within an inner peripheral portion of a cylindrical lens supporting member 4.

A permanent magnet 6 is fixed on a circumferential portion of the imaging lens 5. Then, it is so designed that the imaging lens 5 is driven or transported by a force produced from a current of magnetic coil element 7. These magnetic coil elements 7 are arranged in the inner peripheral portion of the lens supporting member 4 along a longitudinal direction of the lens supporting member 4.

Also, a lens position detecting element (not shown) is arranged in the inner peripheral portion of the lens supporting member 4 so as to detect a present position of the imaging lens 5, so that a positional information signal S1 is outputted from this lens position detecting element to the main body 3 of the video tape recorder.

In the main body 3 of the video tape recorder, the positional information signal S1 is inputted to a system control unit 9 arranged by a CPU (central processing unit), and also both of a zoom signal S2 and an auto-focus signal S3 are inputted to this system control unit 9.

In response to the positional information signal S1, the zoom signal S2 and the auto-focus signal S3, the present position of the imaging lens 5 and a predicted position of the imaging lens 5 after being servo-controlled are calculated by the system control unit 9.

The system control unit 9 furnishes drive amount information corresponding to the present position of the imaging lens 5, as a zoom information signal S4 and an auto-focus information signal S5, to a linear motor drive unit 10, and also furnishes a servo error occurred after the imaging lens 5 has been driven, as a servo signal S6, to this linear motor drive unit 10.

Furthermore, when a servo current which arrests the movement of the imaging lens 5 continuously flows for a time period longer than a predetermined time period, despite the auto-focusing mode and the zooming mode being fixed (that is, during a "stationary servo mode"), the system control unit 9 outputs a power-supply-off signal S7 to a power supply unit in order to turn off the drive power source, and also outputs an alarm signal S8 to a speaker 11, so that an alarm sound is produced from the speaker 11.

Moreover, a current value required to bring the imaging lens 5 to the stationary condition is calculated in the system control unit 9 based upon the servo current flowing through the magnetic coil elements 7 during a stationary servo mode. When an acceleration exerted along the direction of the optical system is sensed from detection of this servo current, this sensed acceleration is output as acceleration information S9 to a monitor 12 under control of the system control unit 9, so that the acceleration value is displayed on this monitor 12.

The linear motor drive unit 10 supplies a current to the magnetic coil elements 7 in response to the zoom information signal S4, the auto-focus information signal S5 and the servo signal S6, and then this current is output to the magnetic coil element 7 as a drive signal S10 from the linear motor drive unit 10.

With the above-described arrangement, upon detection of the present position of the imaging lens 5 based on the positional information signal S1 inputted from the position detecting element 8, the system control unit 9 outputs the zoom information signal S4, the auto-focus information signal S5 and the servo signal S6 to the linear motor drive unit 10 in accordance with either a zooming instruction, or auto-focusing information issued by a VTR camera operator with regard to this lens position, so that the imaging lens 5 is driven to a preselected position. When the system is placed in the aforementioned stationary servo mode in which the auto-focus control is turned off and the zooming position fixed, the system control unit 9 outputs a servo signal S6 to the linear motor drive unit 10 so that the imaging lens 5 is at rest at a present position. Once this is accomplished, if the optical axis of the imaging lens 5 is positioned in the horizontal direction and no external force is applied to the imaging lens 5, no servo signal S6 is thereafter output from the system control unit 9 to the linear drive unit 10, so that no servo current flows.

Figure 2:
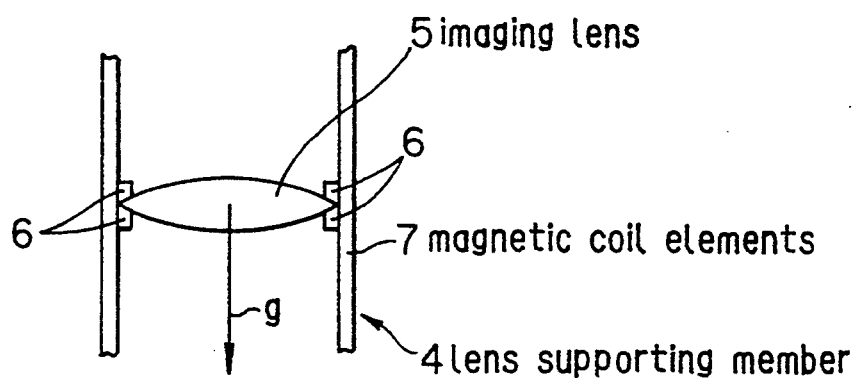
FIG. 2 schematically illustrates a basic idea to detect a component force along a direction of an optical axis of a lens system employed in the imaging apparatus shown in FIG. 1.

Alternatively, as shown in FIG. 2, when the orientation of the camera-integral type video tape recorder 1 is changed in such a manner that the surface of the imaging lens 5 is moved in the direction shown, a force caused by gravity "g" is applied to the imaging lens 5 in such a way that the imaging lens 5 is positionally shifted downward with respect to the servo position.

At this time, the system control unit 9 outputs the servo signal S6 to the linear motor drive unit 10 in such a manner that the imaging lens 5 is held at the stationary position.

As described above, although the stationary servo mode becomes effective, the servo signal S6 is outputted. As a consequence, the system control unit 9 judges that a VTR user has forgotten to turn off the power supply of this VTR 1, and therefore outputs an alarm sound and turns off the power supply of the VTR 1 after a predetermined time period has passed.

Furthermore, the system control unit 9 can detect a shifted angle of the optical axis with respect to the vertical direction from the current value of the servo signal S6, and can display this shifted angle on the monitor 12.

In contrast to the above case, when acceleration is given to the camera-integral type video tape recorder 1 along the horizontal direction under such a condition that the optical axis of this camera-integral type video tape recorder 1 in the stationary servo mode is fixed along the horizontal direction, an external force caused by this acceleration is given to the imaging lens 5 in either a forward direction, or a backward direction.

At such a time, the system control unit 9 detects the magnitude of the acceleration from the current value of the servo signal S6, and the detected result is displayed on the monitor 12 under control of the system control unit 9.

In accordance with the above-described arrangement, in case that the operation mode of the camera-integral type video tape recorder 1 is brought into the stationary servo mode, when the servo signal S6 is provided in such a way that the present position of the imaging lens 5 is held, the direction of the optical axis can be detected based upon the magnitude of this servo signal S6. As a consequence, it is possible to effectively prevent an image of the ground mistakenly being recorded by the camera-integral type video tape recorder 1 without additionally providing a specific sensor for sensing the orientation of the optical axis.

Since the magnitude of the servo current S6 is varied in response to the acceleration applied to the imaging lens 5, acceleration applied to a vehicle and an aircraft and the like may be detected with employment of the servo system of the camera-integral type video tape recorder 1.

Although both of the optical axis direction and the acceleration in the camera-integral type video tape recorder 1 have been detected by using the servo signals S6 in the above-described preferred embodiment, the present invention is not limited thereto, but may be applied to a focusing optical system of a camera, and the like.

As previously described, in accordance with the present invention, in the imaging apparatus wherein the lens system mounted within the housing is driven by the linear motor, the component of force applied along the optical axis direction, among the external force given to the lens system is detected based upon the control signal outputted to the lens drive means during the stationary servo mode, so that the acceleration added to the lens system and also along the optical axis direction of the lens system can be sensed with employment of the drive means for this lens system.

What is claimed is:

1. An imaging apparatus wherein a lens system mounted within a housing is driven by a linear motor, comprising:
   position detecting means for detecting a position of said lens system;
   lens driving means for driving said lens system to a predetermined position, said lens system having an optical axis extending in a first direction;
   controlling means for outputting a control signal to said lens driving means based upon position detecting information derived from said position detecting means to control positioning of said lens system; and
   component force detecting means for detecting a component of force applied to said lens system and extending in said first direction when said imaging apparatus is in a stationary servo mode, and for providing a component force signal indicative of the magnitude of said component of force, said component of force being determined from said position detecting information and said control signal.

2. An imaging apparatus as claimed in claim 1, wherein said lens driving means is a linear motor which includes a plurality of magnetic coil elements and a permanent magnet.

3. An imaging apparatus as claimed in claim 1, wherein said controlling means includes a central processing unit.

4. An imaging apparatus as claimed in claim 1, wherein said imaging apparatus is a camera-integral type video tape recorder.

5. An imaging apparatus as claimed in claim 1, further comprising monitor means for visually indicating the magnitude of said component of force based on said component force signal.

6. An imaging apparatus as claimed in claim 1, wherein said component of force is a component of a force which arises from the acceleration due to gravity, g.

7. An imaging apparatus as claimed in claim 6, wherein said controlling means determines the orientation of said imaging apparatus relative to the direction of said component of force based on said component force signal.

8. An imaging apparatus as claimed in claim 7, further comprising means for indicating to an operator of said imaging apparatus that said imaging apparatus is oriented in a direction having a vertical component exceeding a threshold amount.

9. An imaging apparatus as claimed in claim 7, wherein said controlling means determines whether said imaging apparatus is oriented in a direction having a vertical component exceeding a threshold amount, and further comprising means for shutting off power to said imaging apparatus when said threshold amount has been exceeded for a predetermined period of time.

* * * * *